Oct. 26, 1965 K. H. FRIELINGHAUS 3,214,729
PULSED ULTRASONIC DETECTOR
Filed May 18, 1961 3 Sheets-Sheet 1
FIG. IA.
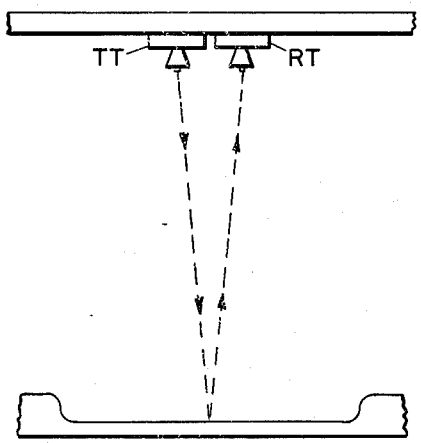
FIG. IB.
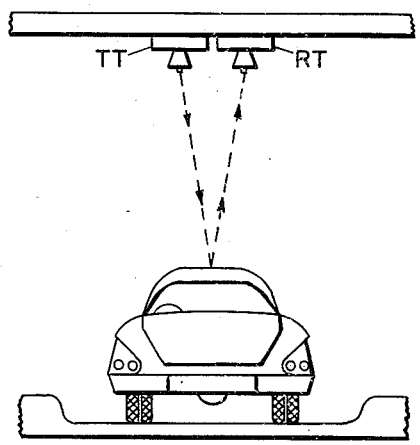
FIG. IC.
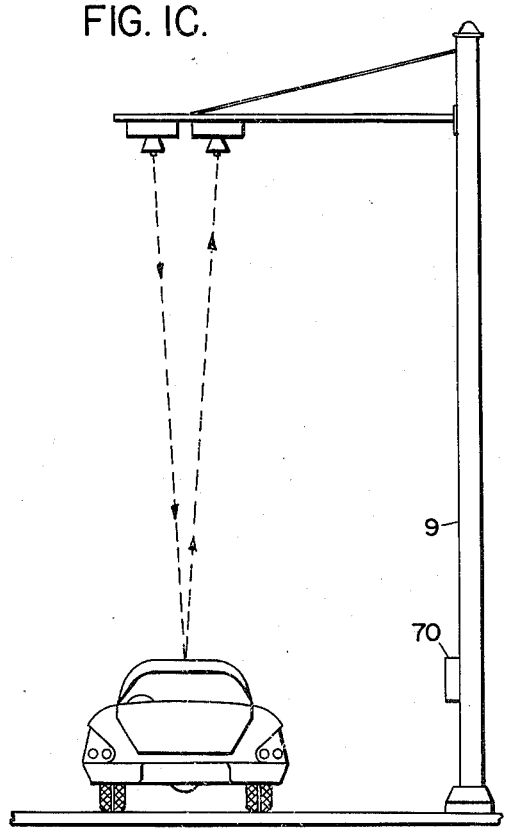
FIG. ID.
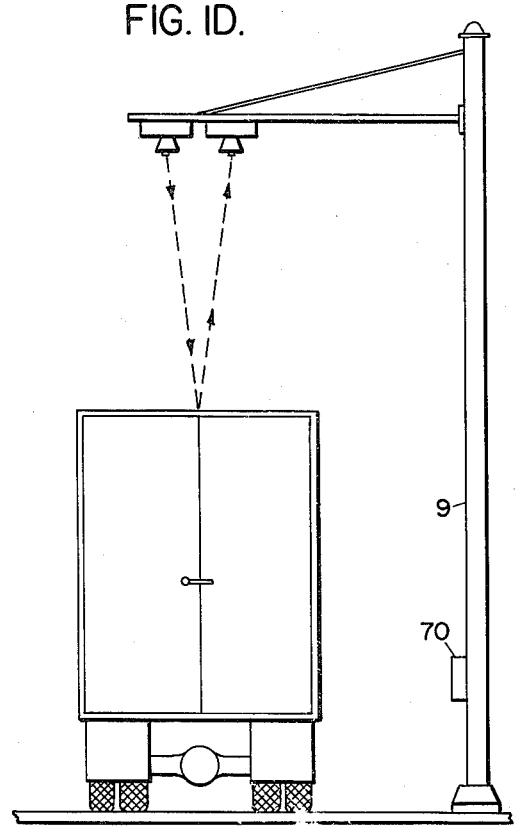
INVENTOR.
K.H. FRIELINGHAUS
BY
HIS ATTORNEY

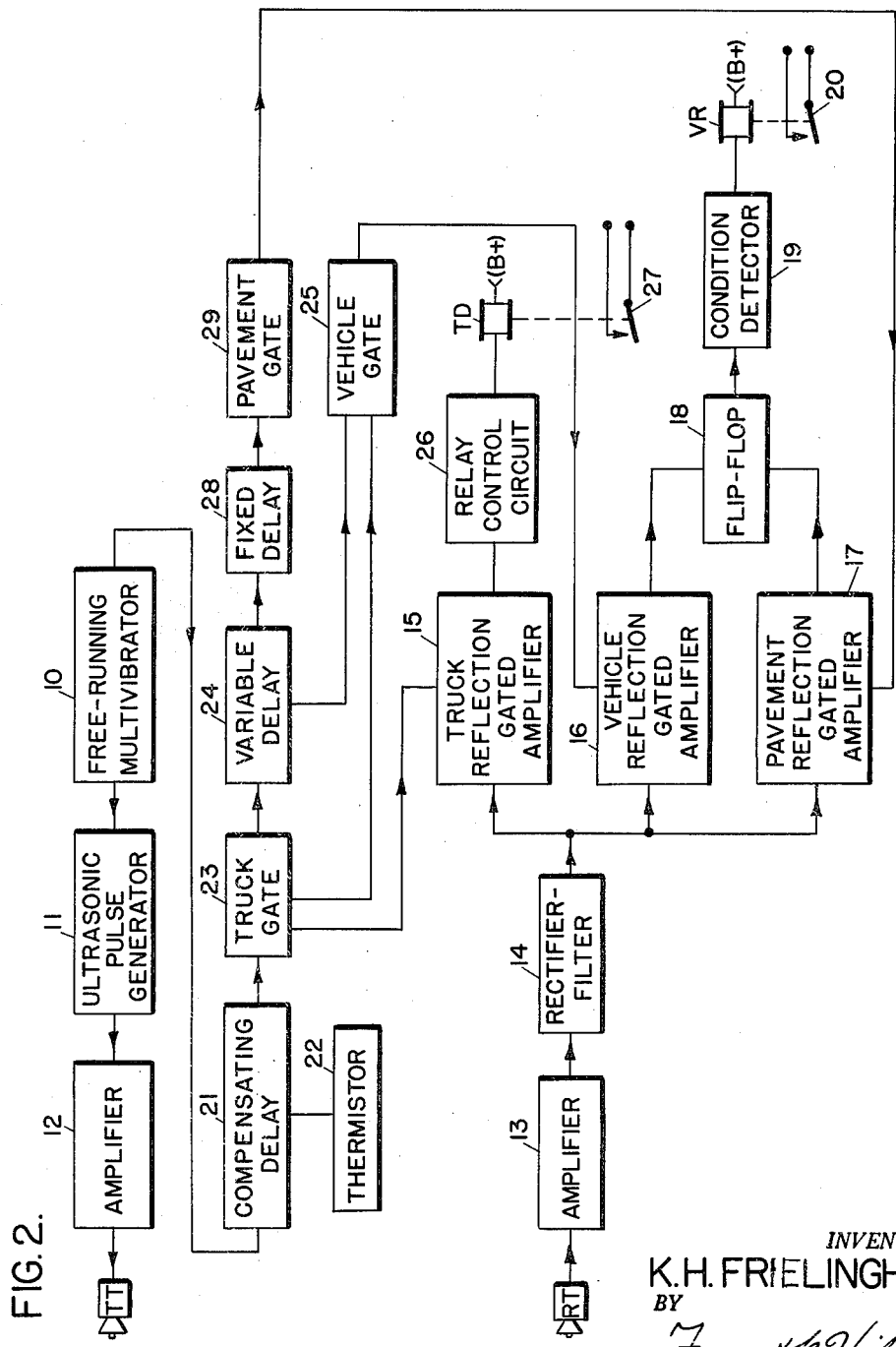

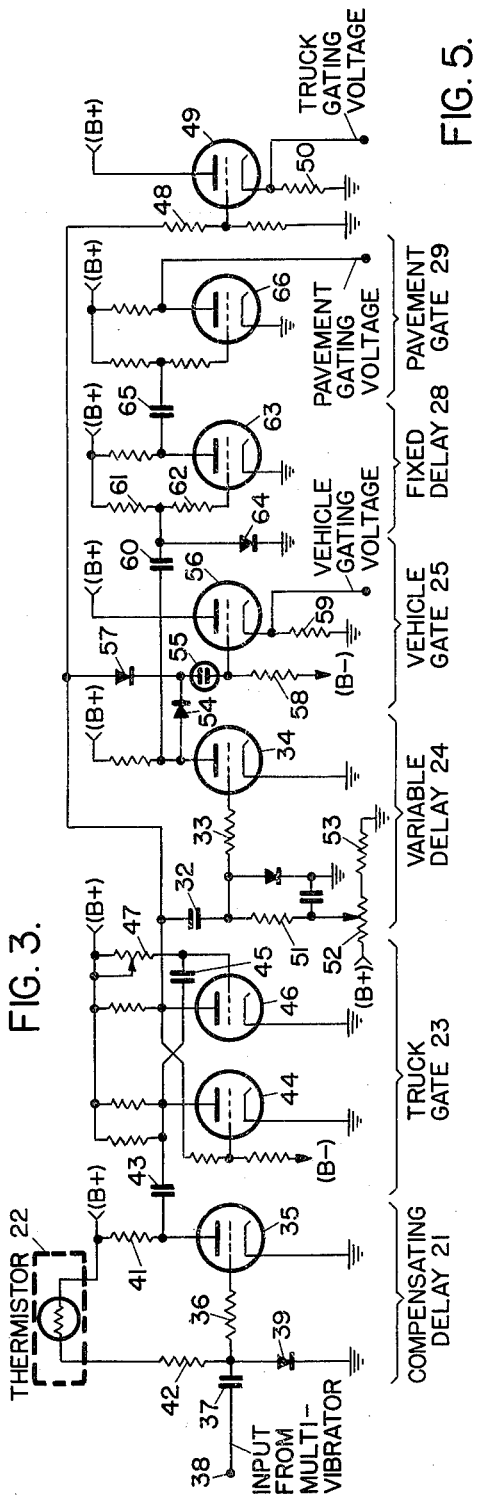
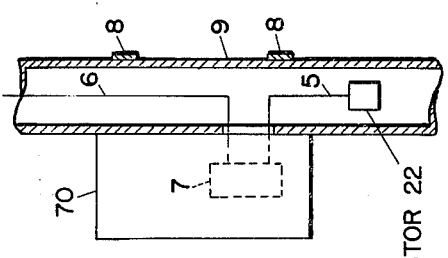
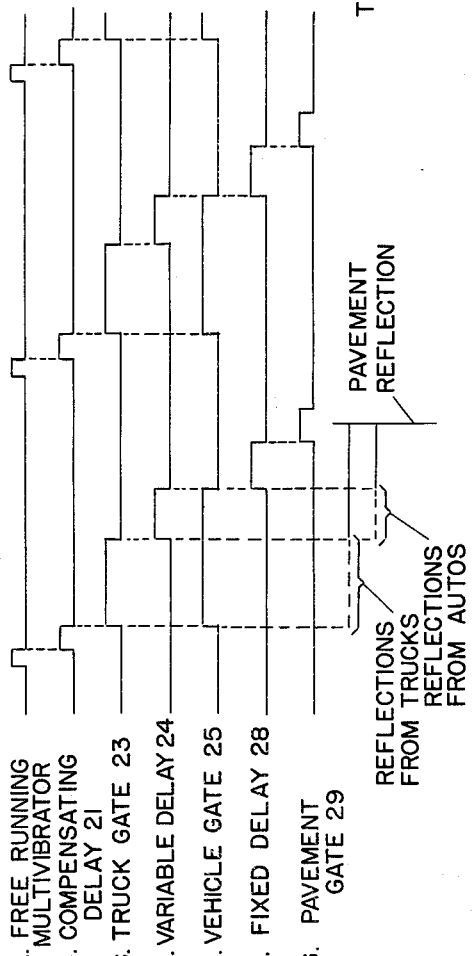

United States Patent Office 3,214,729
Patented Oct. 26, 1965

3,214,729
PULSED ULTRASONIC DETECTOR
Klaus H. Frielinghaus, Rochester, N.Y., assignor to General Signal Corporation, a corporation of New York
Filed May 18, 1961, Ser. No. 111,076
11 Claims. (Cl. 340—38)

This invention relates to the detection of objects and especially vehicles, and more particularly pertains to such systems wherein the objects or vehicles are detected as the result of their passing through a beam of sound energy. This invention is analogous in subject matter to, and is an improvement over, what is disclosed and claimed in the prior applications of H. C. Kendall et al., Serial No. 808,736, filed April 24, 1959, now Patent No. 3,042,303, issued July 3, 1962, and that of J. H. Auer, Jr., Serial No. 820,325, filed June 15, 1959, now Patent No. 3,045,909, issued July 24, 1962, both of which prior patents are assigned to the assignee of the present application.

In the systems disclosed in these two prior applications, a beam of repetitive sound pulses is directed across the path of each object or vehicle. A receiver is included which has a sound transducer so positioned and directed that it is responsive to the reflections of each sound pulse from the vehicle as it intercepts the transmitted sound beam. The transmitted sound beam is preferably also directed in such a way and the receiving transducer so positioned that, in the absence of a vehicle, the transmitted sound energy is instead reflected from a fixed reflecting surface, which is more remote than the vehicle, back toward the receiving transducer. The beam of sound pulses can impinge upon this fixed reflecting surface only when no vehicle is present since the vehicle when lying within the sound beam blocks the beam. Such an arrangement can readily be provided by positioning both transmitting and receiving transducers over a line of traffic and directing both downwardly, so that the transmitted sound beam is directed toward and reflected from the top of each passing vehicle when it is within the second beam but is instead reflected from the pavement when no vehicle is present.

Because of the considerably longer propagation time of each sound pulse when it is reflected from the pavement instead of from the top of a passing vehicle, each pavement reflection pulse is received at a later time with respect to the transmitted pulse time than is the vehicle reflection pulse. Electronic gating circuits are used in the systems of these prior applications to demarcate successive time intervals following the transmission of each sound pulse, and these gating circuits make it possible to distinguish a pavement reflection pulse from a vehicle reflection pulse. Incidentally, the repetition rate of the transmitted sound pulses is made sufficiently slow to permit each sound pulse to be received by the receiving means following its reflection from a vehicle within the designated detection zone prior to the transmission of the next sound pulse. This requirement eliminates ambiguity since it relates each reflection pulse definitely to the last-transmitted pulse.

The prior application Ser. No. 808,736, in particular, describes how it is possible to achieve a very high degree of accuracy in vehicle detection so as to discriminate clearly between the desired vehicles to be counted and other extraneous objects. This is brought about, in part, by so organizing the system that a single count can be registered only by going through a prescribed cycle of events. Such cycle comprises: first, the reception of reflections from the top of a passing vehicle concurrently with the interruption of sound reflections from the pavement at the time the vehicle enters the sound beam; and second, the re-establishment of pavement reflections concurrently with the interruption of the previously received vehicle reflection pulses. The dual requirement that both vehicle reflections be received and pavement reflections be concurrently interrupted is of considerable effect in eliminating spurious responses which might otherwise result from the passage of people or animals, for example, through the detection zone. Thus, a person passing through the beam might very well be able to reflect an occasional pulse back to the receiving transducer, but it is not likely that such person could at the same time entirely block the sound beam so as to prevent all reflections from the pavement. Such a system also provides that a vehicle having a plurality of sound reflecting surfaces spaced by non-reflecting surfaces (a convertible car, for example) will be counted as a single vehicle, rather than as two separate vehicles corresponding to each of the spaced sound reflecting surfaces; in other words, the failure of the pavement reflections to be received when the cloth top is within the sound beam prohibits the restoration of the registering means to its normal condition so that the subsequent recurrence of vehicle reflections is not identified as coming from a second vehicle.

In the prior systems of this general type, a plurality of electronic timing circuits demarcate the successive intervals during which vehicle and pavement reflections can be expected at the receiving transducer. Each timing circuit demarcates a respective interval, with the first timing circuit being set into operation at the time of transmission of a sound pulse. Each timing circuit after the first is set into operation at the instant that the preceding timing circuit has completed its timing operation. One of these timing circuits designates the particular interval throughout which vehicle reflection pulses can be expected and a separate timing circuit similarly designates a subsequent interval throughout which pavement reflection pulses can be expected. It is often desirable to be able to distinguish between automobiles and trucks. This can be accomplished by providing a separate timing circuit which will demarcate the interval throughout which a reflection pulse can be expected to be received from the top of a passing truck and using the output of such timing circuit as a gating voltage to distinguish a received truck reflection pulse from other reflection pulses.

When the system is to be organized to provide a separate output signal for a truck passing through the detection source in addition to the usual output signal provided for each vehicle (regardless of whether it is a truck or an ordinary automobile), it is then necessary to provide a first gated amplifier circuit which is responsive to each reflection pulse obtained from a vehicle regardless of whether that vehicle is a truck or an automobile, and it is also necessary to provide a gated amplifier which will be responsive only to each reflection pulse obtained from a truck. In order to provide a high degree of discrimination against the detection of people, animals, etc., in the manner previously described, a further gated amplifier is provided which will produce an output signal only when a reflection pulse is obtained from the pavement.

Each of these various gated amplifier circuits has applied to it an input pulse corresponding to each reflection pulse received by the receiving transducer. The timing circuits previously described selectively gate these various gated amplifiers, permitting the truck reflection gated amplifier to be responsive only throughout the time that a vehicle reflection pulse can be expected, permitting the vehicle reflection gated amplifier to be operated only throughout the time that a reflection pulse can be expected from a vehicle regardless of whether that vehicle is a truck or an auto, and permitting the pavement reflection gated amplifier to be operative only throughout the time that a pavement reflection pulse can be expected. Therefore, when no vehicle is present, the pavement reflection amplifier produces an output signal for each transmitting sound pulse but no output signal is, under these circumstances, obtained from either the vehicle reflection gated amplifier or from the truck reflection gated amplifier. On the other hand, when either an auto or a truck passes through the detection zone, there is then no output signal obtained from the pavement reflection amplifier, but an output pulse is then obtained from the vehicle reflection amplifier for each sound pulse that is transmitted. If that particular vehicle is higher than an ordinary automobile, an output pulse will then be obtained from both the vehicle reflection amplifier and the truck reflection amplifier in response to each transmitted sound pulse.

Detection circuits are controlled by the various gated amplifier circuits and are distinctively controlled in accordance with which of the various gated amplifiers is, at any time, effective to provide a distinctive output signal. These detection circuits indicate whether a vehicle is present in the detection zone and also indicate whether such vehicle is an auto or a truck.

Undoubtedly there is a considerable difference in height between an average auto and an average truck. However, an individual vehicle falling within either of these two respective classes may have a height varying considerably from that of the average for that class. Thus, there are now an increasing number of vehicles on the highways which are quite low and there are also vehicles which are properly classifiable as autos but which have a height considerably higher than that of the average automobile and whose height may, in fact, come close to that of a truck. For this reason it is very important, in order to provide a high accuracy of vehicle detection, that the various timing circuits be effective to demarcate accurately the respective intervals.

In actual use of vehicle detector systems constructed according to the principles just described, it has been found to be difficult to maintain the necessary accuracy of timing as ambient temperature conditions vary widely. Thus, a large variation in ambient temperature does have a certain effect upon the operation of the various electronic gating circuits, and this is one factor that must be taken into account; nevertheless, even though adequate compensation is made for this, a satisfactory solution to the problem has, in the past, still not been obtained. The reason for this is that large variations in temperature have an appreciable effect upon the velocity of sound propagation. Thus, as is well known, the velocity of sound increases with increases in temperature and, for this reason, the propagation time of a transmitted sound pulse from the transmitting transducer to the pavement or to the upper reflecting surface of a vehicle and thence back to a receiving transducer will vary quite appreciably as ambient temperature conditions vary over a range which may be as great as 120° F.

To overcome this problem, it is desirable to organize the receiving apparatus in such a manner that the various time intervals demarcated will still occur at the proper times even though the propagation time of the sound beam may vary quite appreciably with variations in temperature.

Described briefly, it is contemplated by the present invention to provide a timing means whose operation is automatically variable in accordance with ambient temperature conditions. As the operating time of the timing means varies with changes in temperature, the time of occurrence of each of the previously mentioned gating voltages is shifted so that it will still encompass the expected repection time of truck, auto, or pavement reflections, as the case may be. In actual practice, it has been found expedient to employ a thermistor in conjunction with an electronic timing circuit. The timing circuit itself may be positioned within an equipment case provided for the rest of the electronic apparatus but the thermistor is preferably located in a place where it is subject to the temperature of the air through which the sound pulses are transmitted.

It is thus an object of the present invention to provide a pulsed, ultrasonic vehicle detection system which accurately demarcates various timing intervals so that sound pulse reflections obtained from various reflecting surfaces may be discriminated between even though temperature conditons may vary and thus result in variation in the velocity of sound propagation.

It is another object of this invention to provide a pulsed, ultrasonic vehicle detection system which is organized to provide a high degree of discrimination between vehicles of different height classes even over conditions where ambient temperature varies over a considerable range.

It is a further object of this invention to provide a vehicle detection system of the ultrasonic, pulsed type which employs at least one electronic timing circuit whose timing characteristics are automatically variable in accordance with ambient temperature conditions.

Other objects, purposes and characteristic features of this invention will be in part obvious from the drawings and in part will also be set forth as the description of the invention progresses.

To simplify the illustration and facilitate the description of the invention, the various parts and circuits constituting the embodiment of this invention are shown diagrammatically and certain conventional circuits and elements are illustrated in block diagram. The symbols (B+) and (B—) indicate connections made to the opposite terminals of a source of voltage suitable for the operation of electron tubes and the like, and the symbol for a ground connection indicates a tap which is intermediate between the (B+) and (B—) voltage levels.

In describing the invention in detail, reference will be made to the accompanying drawings in which like reference characters indicate corresponding parts in the several views, and in which:

FIGS. 1A and 1B illustrate one manner in which the receiving and transmitting transducers may be positioned over the roadway;

FIGS. 1C and 1D illustrate the manner in which the paths of sound pulses vary in accordance with whether an automobile or a truck is passing through the sound beam;

FIG. 2 is a block diagram illustrating the electronic circuits for a pulsed ultrasonic vehicle detection system constructed according to the principles of the present invention;

FIG. 3 is a circuit diagram illustrating in detail a portion of the circuit shown in block diagram form in FIG. 2 and especially directed toward the novel features of the present invention;

FIG. 4 is a wave form diagram illustrating certain voltage wave forms which appear in the circuits of FIG. 3; and FIG. 5 illustrates the manner in which the temperature regulating device such as a thermistor may be physically positioned with respect to the other apparatus of this invention so as to compensate for variations in ambient temperature conditions.

FIG. 1A illustrates the manner in which the receiving and transmitting transducers RT and TT, respectively, may be positioned over a roadway and both directed downwardly. In the absence of any vehicles, the sound pulses emanating from the transmitting transducer TT impinge upon the pavement and are then reflected back toward the receiving transducer RT as shown in FIG. 1A. FIG. 1B illustrates how the sound pulses are reflected from the top of a passing vehicle when it is within the beam and demonstrates that reflections of these pulses are also returned to the receiving transducer with an appreciably shorter round trip propagation time than when they are reflected from the pavement.

The transducers TT and RT of FIGS. 1A and 1B are mounted quite closely above the top of the vehicle, and this is the arrangement that is most often employed at the entrance to a parking garage, for example. When the vehicle detection system is to be used for detecting vehicles passing along a highway, they are then preferably mounted at a considerably greater distance above the roadway so as to provide ample clearance for the higher vehicles expected to travel along the roadway. Thus, the transducers may be mounted from a mast arm as shown in FIGS. 1C and 1D, with the mast arm being affixed to a vertical post.

In FIG. 1C, the propagation time of each vehicle reflection pulse is relatively long even though shorter than for a pavement reflection pulse; however, when a high vehicle such as a large trailer truck passes through the sound beam as in FIG. 1D, the path of each sound pulse is considerably shorter.

In the block diagram of FIG. 2, the sound pulse transmitting means includes a free running multivibrator 10 whose frequency of operation establishes the sound pulse repetition rate of the system. A repetition rate of 20 sound pulses per second has been found to be suitable. This rate provides a pulse period of 50 milliseconds, and this is generally long enough so that a sound pulse can be received from the most distant reflection surface, which, in this case, is the pavement, prior to the transmission of the next sound pulse.

The output of multivibrator 10 is applied to an ultrasonic pulse generator 11 which provides a brief electronic pulse having an ultrasonic frequency such as 20 kc. for each cycle of operation of multivibrator 10. Each sound pulse thus generated is amplified by amplifier 12 and applied to the transmitting transducer TT which converts the electrical energy to a pulse of sound energy which is then directed to the passing vehicles.

Reflected sound pulses which impinge upon the receiving transducer RT are converted by this transducer to electrical energy which is amplified by an amplifier 13 which may be tuned to the frequency of the transmitted sound pulses so that it will readily pass such reflection pulses but at the same time tend to reject extraneous sound energy occurring at other frequencies. The output of amplifier 13 comprises a brief alternating-current signal for each received sound pulse. This signal is both rectified and filtered by the rectifier-filter 14 so that a unidirectional voltage pulse is applied to the inputs of the truck reflection gated amplifier 15, vehicle reflection gated amplifier 16 and pavement reflection gated amplifier 17.

Each of these amplifiers 15–17 is selectively gated so that it can respond to an input pulse received from rectifier-filter 14 only during a predetermined time interval following the transmission of a sound pulse. More specifically, amplifier 15 is gated so that it can provide an output pulse only in response to an input pulse obtained from rectifier-filter 14 and occurring during a particular time interval following the transmission of the last sound pulse which will encompass the expected time of reception of a sound pulse reflected from a high vehicle such as a truck. In other words, this amplifier 15 is gated only throughout an interval which occurs relatively soon after the transmission of each sound pulse. In a similar manner, amplifier 16 is gated so that it can produce an output pulse in response to each input pulse from rectifier-filter 14 only when such input pulse occurs during a time interval encompassing the expected reception time of a reflection pulse from a vehicle regardless of whether that vehicle is an automobile or a truck. In other words, this amplifier 16 is gated throughout the time that amplifier 51 is gated and is also gated for a time thereafter so that it will respond also to reflection pulses having the longer propagation time that results when a sound pulse is reflected from a vehicle of lower height than a truck, i.e., an automobile. Amplifier 17, on the other hand, is gated by a voltage whose duration encompasses the expected reception time of a reflection pulse from the pavement. The length of this gating voltage may be made relatively short since the distance between the transducers and the pavement is fixed and this gating voltage thus need not encompass an interval of long duration.

Flip-flop 18 receives one input signal from amplifier 16 and another from amplifier 17. When no vehicle is within the detection zone, the flip-flop receives an input pulse from amplifier 17 for each transmitted sound pulse since, under such a condition, each transmitted sound pulse will be reflected from the pavement and will result in an output pulse from amplifier 17. When this occurs, flip-flop 18 is operated to and thereafter steadily remains in one of its two opposite and stable states. In contrast to this, when a vehicle is within the sound beam, an output pulse will be obtained from amplifier 16 for each transmitted sound pulse, since such reflection pulse will always cause an input to be applied to amplifier 16 at a time when it is gated by the vehicle gating voltage, regardless of whether the vehicle then within the detection zone is an automobile or a truck. Under these conditions, flip-flop 18 will be operated to the other of its two stable states and will remain steadily in such other state.

Flip-flop 18 is thus steadily in one of its two distinctive conditions whenever a vehicle is present and in the other of its two distinctive conditions when no vehicle is present. The condition detector 19 is so organized as to sense this condition of flip-flop 18; when it has sensed that the flip-flop is in the first of its two conditions, it acts upon the relay control amplifier 20 to cause relay VR is pick up. However, when the detector 19 senses that flip-flop 18 is in the other of its two distinctive conditions, it acts upon relay control amplifier 20 to cause relay VR to drop away. Thus, relay VR goes through a complete cycle of operation for each vehicle passing through the sound beam.

A high degree of discrimination against spurious reflections may be obtained by the circuit organization which includes amplifiers 16–17, flip-flop 18, condition detector 19, and relay control amplifier 20. This may be provided by organizing these various circuits in the manner specifically shown in the prior application of J. H. Auer, Jr., Serial No. 820,325, filed June 15, 1959.

The manner in which the gating voltages and the various gated amplifiers 15–17 cooperate will now be described with reference to the block diagram of FIG. 2. An understanding of the description will be facilitated by referring to the wave form diagram of FIG. 4.

The free-running multivibrator 10, shown in FIG. 2, not only controls the pulse generator 11 as already mentioned, but also initiates the operation of a delay circuit which is designated as the compensating delay 21. Referring to FIG. 4, it can be seen that the negative-going trailing edge of each output pulse from multivibrator 10 starts the timing operation of this compensating delay 21, and that this latter delay circuit 21 demarcates a relatively brief interval at the beginning of each cycle. Associated with this compensating delay 21 is a thermistor 22 which is subject to ambient temperature and is thus able to control the delay time of the compensating delay 21 so that the delay time provided thereby will increase in accordance with the propagation time of sound through air as this varies with the prevailing temperature.

When the compensating delay 21 is restored to its normal condition, the negative-going trailing edge of its output pulse initiates operation of a further timing circuit designated as the truck gate 23. As shown at line C of FIG. 4, the truck gate, when set into operation, demarcates a time interval throughout which it provides an output voltage which is above its normal level.

When the timing circuit of the truck gate 23 restores itself to normal, operation of the variable delay 24 is initiated. This delay circuit also produces a positive-going output voltage during the time which it demarcates. As will later be shown, the length of time demarcated by this delay circuit 24 is variable, although it should be understood that it is not variable automatically in accordance with temperature as is the compensating delay 21; rather, a manual adjustment is provided by means of which the delay time for this delay circuit 24 may be controlled.

Both the truck gate 23 and variable delay 24 supply their output gating voltages to the vehicle gate 25. This vehicle gate 25 is, in effect, a repeater of its input signals so that it produces an output gating voltage as shown in line E of FIG. 4 which encompasses the total successive time intervals demarcated respectively by the truck gate 23 and variable delay 24. In other words, the output voltage of vehicle gate 25 comprises a positive-going voltage which encompasses the expected arrival time of a reflection pulse from any vehicle, whether that vehicle be a truck or a vehicle of lower height such as an automobile. The gating voltage provided by vehicle gate 25 is applied as a gating input to the vehicle reflection gated amplifier 16. The effect of this gating voltage upon amplifier 16 has already been described.

The truck gating voltage produced by the truck gate 23 is supplied to the truck reflection gated amplifier 15 so that this latter amplifier is gated to provide an output signal for each sound pulse reflected from the top of a passing truck and thus having a relatively short round trip propagation time. The relay control circuit 26 is responsive to the output of amplifier 15 so that upon the occurrence of a succession of output pulses from amplifier 15, the relay control circuit will be operated to a distinctive condition in which it causes the normally dropped-away relay TD to pick up and close its front contact 27.

When the variable delay 24 has completed its timing operation, an input pulse is applied to the fixed delay 28 which then demarcates a relatively short time interval in the manner shown at line F of FIG. 4. At the conclusion of this latter interval, the negative-going output of the fixed delay which occurs when it is restored to its normal state initiates operation of the pavement gate 29. The time of occurrence of this pavement gate is chosen so as to encompass the expected reception time of a pavement reflection pulse. The positive gating voltage generated by the pavement gate 29 is applied to one input of the pavement reflection amplifier 17. This permits amplifier 17 to produce an output pulse for each occurrence of a pavement reflection, and such pulse is applied to an input terminal of flip-flop 18.

The manner in which the occurrence of the various gating voltages and their duration can be controlled will subsequently be described in greater detail.

Under normal conditions, when no vehicle is within the detection zone, an output pulse will be obtained from amplifier 17 for each transmitted sound pulse. This will ensure that flip-flop 18 will remain steadily in one of its two stable states. As long as the flip-flop is in such state, it acts upon the condition detector 19 to hold relay VR in a dropped-away condition. However, if any vehicle is within the detection zone, irrespective of whether that vehicle is an automobile or a truck, there will then be no output pulses obtained from amplifier 17 because the presence of such vehicle will prevent the sound beam from impinging upon the pavement and then being reflected back toward the receiving transducer. At the same time, however, the presence of such vehicle will produce an output pulse from amplifier 16 for each transmitted sound pulse, and then the flip-flop 18 will receive successive input pulses on its other input terminal. The flip-flop will then operate to its opposite condition and remain there, and as long as it remains in such other condition, it will control condition detector 19 to pick up relay VR.

Referring now to the detailed circuits of FIG. 3, there is shown in detail in FIG. 2 the compensating delay 21, the truck gate circuit 23, variable delay 24, vehicle gate 25, fixed delay 28, pavement gate 29, and a cathode follower which is associated with truck gate 23. The remainder of the circuit of FIG. 2 comprises conventional electronic circuitry and thus need not be shown in detail in FIG. 3.

Compensating delay 21 comprises a triode tube 35 whose cathode is grounded and whose control grid 35 is connected through a resistor 36 and capacitor 37 to input terminal 38. It will be understood from the block diagram of FIG. 2 that this terminal 38 is connected to one output of the free running multivibrator 10 shown in FIG. 2. The junction of capacitor 37 and resistor 36 is connected through a diode 39 to ground and a connection is also made from this same junction through thermistor 22 to (B+). The plate of triode 35 is connected through resistor 41 to (B+) also.

Line A of FIG. 4 shows that the output of multivibrator 10 which is applied to terminal 38 comprises a relatively brief pulse of positive-going voltage. On the positive-going leading edge of this pulse, the control grid of tube 35 is prevented from going positive by reason of the diode 39 which prevents the upper terminal of the diode from going to any substantial degree above ground. On the negative-going trailing edge of the multivibrator pulse, the upper terminal of diode 39 goes substantially below ground in potential, thereby driving tube 35 to beyond cut-off so that its normal plate voltage is reduced very substantially at such time. The length of time throughout which tube 35 remains cut off is dependent entirely upon the time constant for the discharging of capacitor 37 and this, in turn, is dependent upon the value of resistance presented by resistor 42 and thermistor 22. When the time constant is large, by reason of there being a high value of resistance in the discharge circuit, then capacitor 37 must discharge quite slowly and this holds tube 35 in a cut-off condition for a longer time interval. As a result, there is provided a positive-going voltage pulse at the plate of tube 35 whose duration depends upon the value of this time constant. This voltage pulse is shown at line B of FIG. 4.

Since a thermistor such as the thermistor 22 is employed in this circuit, it is clear that the time constant of the circuit is dependent upon the temperatures experienced by the thermistor. By placing the thermistor in a location where it is subject to the temperatures existing in the air through which the sound pulses are transmitted, it is then clear that the voltage pulse provided by tube 35 will vary in length with the sound propagation time, with the voltage pulse being longer as the propagation time increases. In actual practice, the thermistor 22 may be located as shown in FIG. 5 wherein an equipment case is shown as being affixed by means of conventional bolted straps 8 to a vertical pole 9 which is shown in cross section. The equipment case 70 is shown as having therein a chassis 7 which represents the transmitting and receiving equipment such as is shown in block diagram in FIG. 2. Connections are made from this chassis 7 via a cable 6 to the overhead transducers TT and RT. Another cable connects this chassis 7 to the thermistor 22 via a cable 5. Thus, the thermistor is actually mounted within the vertical pole 9 so that it is subject to the prevailing temperature conditions but is almost entirely unaffected by any heat which may be generated by the various electrical components positioned within the equipment case 70. This manner of positioning the thermistor is only typical of many which may be provided and it is to be understood that the invention is not in any manner to be limited to the location of the thermistor as shown in FIG. 5.

When tube 35 is restored to its normal conductive condition so that its plate voltage goes abruptly negative, a negative trigger pulse is applied through capacitor 43 to the plate of triode tube 44 and thence through capacitor 45 to the control grid of tube 46. Tubes 44 and 46 are interconnected between their respective plates and control grids so as to form a one-shot multivibrator which is designated as the truck gate 23. Since the control grid of tube 46 is connected through a potenimeter 47 to (B+), tube 46 is the normally conductive tube of the multivibrator with tube 44 being fully cut off. The positive-going pulse occurring at the plate of tube 35 at the start of the time interval demarcated by the compensating delay 21 cannot reverse the condition of the multivibrator, but the negative-going pulse occurring when tube 35 again becomes conductive drives the conductive tube 46 to cut off, and this initiates a practically instantaneous reversal of the conductive states of these two tubes. When once reversed, the multivibrator remains in the state wherein tube 46 is cut off for a predetermined length of time which is dependent upon the time constant for the discharge of capacitor 45, and this is dependent upon the amount of resistance in the grid circuit of tube 46 provided by potentiometer 47. Eventually, however, the multivibrator restores itself to the normal state with tube 46 again becoming conductive, and the plate voltage of tube 46 which has been quite high throughout the time that tube 46 was nonconductive, is then abruptly restored to its normal low value. This mode of operation of the multivibrator is illustrated at line C of FIG. 4, and the positive-going pulse at the plate of tube 46 which is thereby provided is designated as the truck gate. The truck gate voltage is applied through resistor 48 to the control grid of cathode follower tube 49 and thus appears in substantially unaltered form across cathode resistor 50. This output voltage is then available to be used as a gating voltage on the truck reflection gated amplifier 15 illustrated in block diagram form in FIG. 2.

The voltage at the plate of tube 46 is also applied through a capacitor 32 and resistor 33 to the control grids of triode tube 34. Tube 34 operates in a manner very similar to that of tube 35. Thus, tube 34 is normally fully conductive since its control grid is connected through resistor 33 and resistor 51 to the variable tap of a potentiometer 52 which is connected in series with resistor 53 between (B+) and ground. The negative-going voltage variation at the plate of tube 46 when the multivibrator restores itself to the normal condition drives tube 34 beyond cut off so that its plate voltage is abruptly increased. The length of time that tube 34 remains cut off as a result of such an input impulse is again dependent upon the time constant for the discharging of capacitor 32 and this can readily be controlled by varying the position of the tap on potentiometer 52. As shown at line D of FIG. 4, this results in the appearance of a positive-going voltage pulse at the plate of tube 34 which starts at the time of restoration of the multivibrator including tubes 44 and 46 and terminates at a time later whose duration can be controlled by the setting of potentiometer 52.

The plate voltage of tube 34 is applied through an isolating diode 54 and through a neon coupling lamp 55 to the control grid of triode 56 which is operated as a cathode follower. The control grid of this cathode follower also receives an input from the plate of tube 46 to which it is coupled through another isolating diode 57. Because of this arrangement, the control grid of tube 56, which is normally biased to cut off by reason of its being connected through resistor 58 to (B−), is now driven positive throughout the consecutive time intervals during which tubes 46 and 34 are, respectively, maintained in a cut-off condition. Therefore, a vehicle gating voltage is obtained across the cathode resistor 59 whose duration equals the combined operating times of the truck gate 23 and variable delay 24 as is graphically illustrated by comparing line E of FIG. 4 with lines C and D.

The plate of tube 34 is also coupled through capacitor 60 to the junction of resistors 61 and 62 which are in series connection between the control grid of triode 63 and (B+). Diode 64 is connected from the junction of resistors 61 annd 62 to ground. Tube 63 thus also acts as a delay circuit in that it is driven beyond cut off at the conclusion of the interval timed by tube 34, with tube 63 remaining cut off thereafter for a length of time governed by the time constants associated with capacitor 60. As is shown at line F of FIG. 4, the interval demarcated by the fixed delay 28 is relatively short. Incidentally, the function of diode 64 is to prevent any positive trigger pulse which might appear at the plate of tube 34 from affecting the control grid voltage of tube 63 and thereby producing an undesired negative trigger pulse at the plate of this tube.

At the end of the interval demarcated by the fixed delay 28, tube 63 again becomes conductive, and when it does so, its voltage goes abruptly in the negative direction. This negative-going voltage variation is coupled through capacitor 65 to the control grid circuit of tube 66 included in the pavement gate 29. This pavement gate 29 comprises another timing circuit which is set into operation upon the restoration of tube 63 to its normal conductive status. The interval of time throughout which tube 66 remains nonconductive is also relatively short as indicated at line G of FIG. 4. However, throughout the time that it is nonconductive, it produces a relatively high voltage at its plate which is then applied to the pavement reflection gated amplifier 17 of FIG. 2.

The gating voltages provided, respectively, by the truck gate 23 and variable delay 24 together make up the vehicle gate 25. Of course, in order for an automobile to be properly registered as such and not to be erroneously identified as a truck, the reflection pulse received from an automobile must occur within the time of the gating voltage provided by the variable delay 24 and not within the time of the gating voltage provided by the truck gate 23. Similarly, for a truck to be properly identified as such, its reflection pulse must occur only throughout the term of the gating voltage established by truck gate 23. Therefore, adjustment of the operating characteristics of variable delay 24 has the effect of establishing the dividing line between automobiles and trucks.

Another way of viewing this situation is that the cumulative time intervals demarcated by the successively operated timing circuits must all be arranged in such a manner that the pavement gate will occur at the expected reception time of a pavement reflection pulse. This may be represented in FIG. 4 by establishing a vertical line representing the pavement and drawing this through the middle of the pavement gate shown at line G. Assuming that automobiles have heights within the range of four to six feet and that sound travels at the speed of one foot per millisecond, it then follows that the time interval demarcated by the variable delay 24 must cover a period ranging from eight to twelve milliseconds to the left of the above mentioned vertical line. Vehicles of greater than six foot height will then be detected as trucks since reflections from their tops will occur within the time interval demarcated by the truck gate 23. Thus, it can be seen that the length of the time interval demarcated by the variable delay 24, in effect, establishes the dividing line between those vehicles detected as autos and those detected as trucks. In practice, this adjustment is made by varying the setting of the variable tap on potentiometer 52 associated with the variable delay 24. Once this is done, it is then necessary to control the length of truck gate 23 by varying the setting of potentiometer 47 in order that the total length of time between operation of multivibrator 10 and the occurrence of the gating voltage produced by pavement gate 29 will be such that the pavement reflection will come at the time the pavement gate is being produced.

Naturally, the length of time that elapses between the transmission of a sound pulse and the reception of the reflection of that pulse from the pavement will be affected by air temperature since the velocity of sound propagation increases at a known rate with increase of air temperature. If this factor is not taken into account, it then becomes quite difficult to maintain the desired timing relationships so that the pavement pulse, for example, will fall within the time of occurrence of the pavement gate and also so that the desired dividing line between autos and trucks will be maintained. This latter factor is also of significance since both automobiles and trucks have heights which vary quite substantially from the average height for each, and it has been found that a dividing line between the two must be quite carefully determined and then quite closely maintained in order for accurate results to be ensured.

The present invention overcomes these difficulties by varying the time of occurrence of the respective gating voltage automatically in accordance with variations of air temperature. Thus, use of the thermistor 22 in connection with the compensating delay 21 provides that the time interval demarcated by the compensating delay 21 will increase as the time of sound propagation increases. It has been found in practice that the various circuit constants may be so selected that the variation in time demarcated by the various gating circuits may be caused to vary in quite close relationship to the variation in sound propagation time. The net effect of this is that all of the desired timing relationships can be closely maintained even though the velocity of sound propagation may vary quite substantially when there are quite radical variations in air temperature.

In the specific embodiment shown, the automatic compensating means comprising the thermistor 22 has been shown as being associated with the compensating delay 21. Thus, as air temperature varies and increases the sound propagation time, for example, the thermistor's resistance increases, thereby increasing the discharge time for capacitor 37 and the length of the interval throughout which the voltage at the plate of tube 35 remains at the upper level. In one actual embodiment of this invention, it was found practical to use the thermistor 22 instead in the circuit of the multivibrator included in truck gate 23. More specifically, the thermistor was connected directly in series with the potentiometer 47. This made it possible to vary the operating time of this multivibrator automatically in accordance with temperature as well as manually by setting the variable tap on potentiometer 47. Regardless of whether the automatic compensating means is employed in connection with a compensating delay 21 or in connection with the truck gate 23, it is obvious that its effect will extend to the operation of all the succeeding timing circuits in the chain. Any variation in time of operation of a preceding timing circuit will, of course, tend to affect the time of occurrence of all succeeding time intervals dictated by later timing circuits.

Having described an improved vehicle detection system employing automatic temperature compensating means as one specific embodiment of this invention, we desire it to be understood that various modifications, adaptations and alterations may be made to the specific forms shown, without in any manner departing from the spirit and scope of this invention.

What I claim is:

1. In a vehicle detection system 3 means for transmitting a beam of repetitive sound pulses across the path traversed by said vehicle so as to impinge upon the sound reflecting surfaces thereof, receiving means including an electro-acoustic transducer so positioned and directed as to receive each vehicle reflection pulse, gating circuit means for demarcating a time interval following the transmission of each sound pulse which encompasses the expected reception time by said transducer of said vehicle reflection pulse, means governed by said receiving means and by said gating circuit means being distinctively operated by the reception of successive reflection pulses during respective of said time intervals, for indicating the presence of a vehicle, and temperature responsive means coupled to said gating circuit means for varying the time of occurrence of said demarcated time interval with respect to the time of transmission of the last-transmitted sound pulse in accordance with variations in the temperature of the air through which said sound pulses are transmitted.

2. The vehicle detection system of claim 1 wherein said sound pulses impinge in the absence of a vehicle upon a fixed sound reflecting surface more distant from said transducer than said sound reflecting surfaces of said vehicle, said gating circuit means also demarcating a second time interval which encompasses the expected reception time by said receiving transducer of a reflection pulse from said fixed reflecting surface, said temperature responsive means varying the time of occurrence of both said time intervals with respect to the time of transmission of the last-transmitted sound pulse automatically in accordance with the temperature of the air through which said sound pulses are transmitted.

3. The invention as defined in claim 2 wherein said temperature responsive means comprises a thermistor.

4. The vehicle detection system of claim 2 wherein said electronic gating circuit means initiates the timing of said second time interval only subsequent to the termination of the first time interval, said temperature responsive means acting upon said gating circuit means to delay the initiation of the first demarcated interval in accordance with the temperature of the air through which said sound pulses are transmitted.

5. The invention as defined in claim 1 wherein said temperature responsive means is located so as to be responsive to variations in temperature of the air through which said sound pulses travel but is substantially unaffected by any heat generated by the remainder of the equipment comprising said vehicle detection system.

6. A system for detecting vehicles as they pass in succession through a detection zone defined by a beam of repetitive sound pulses transmitted across their path and impinging in the absence of any vehicle upon a fixed reflecting surface more distant than the sound reflecting surfaces of said vehicles comprising, means for transmitting said sound pulses, receiving means including a transducer which is so positioned and directed as to receive sound pulse reflections from both said vehicles and said fixed reflecting surface, first timing means for demarcating a first time interval following the transmission of each sound pulse which encompasses the expected reception time at said transducer of said vehicle reflection pulse, second timing means for demarcating a subsequent second time interval which encompasses the expected reception time at said transducer of the reflection of said sound pulse from said fixed reflecting surface, means governed by the temperature of the air through which said sound pulses travel and controlling at least one of said first and second time means to vary the time of occurrence of both said first and second time intervals to thereby cause said time intervals to still occur at the expected reception times of said vehicle reflection and fixed-surface reflection respectively even though the propagation time of sound through air varies as said temperature varies, and means controlled jointly by said first and second means to a distinctive condition when reflection pulses are obtained from a vehicle but concurrently not from said fixed reflecting surface for indicating the presence of said vehicle.

7. The invention as defined in claim 6 including means controlled by said first timing means upon the termination of said first time interval for initiating operation of second timing means, said temperature responsive means being coupled to said first timing means to vary directly the time of occurrence of said first time interval demarcated thereby and indirectly the time of occurrence of said second time interval in accordance with temperature.

8. The vehicle detection system of claim 6 which further includes means for manually adjusting the length of the time interval demarcated by at least one of said first and second means.

9. In a vehicle detection system of the type wherein a beam of repetitive sound pulses is transmitted generally downwardly toward the pavement so as to impinge upon the top sound reflecting surfaces of vehicles passsing through said beam the combination comprising, transmitting means for transmitting said pulses, receiving means including an electro-acoustic transducer which is so positioned and directed that it receives reflections of said sound pulses from the tops of said vehicles, first timing means for demarcating a first time interval following the transmission of each sound pulse which encompasses the expected reception time at said transducer of a sound pulse reflected from vehicles of a first height class comprising higher vehicles such as trucks, second timing means demarcating a second subsequent time interval following the transmission of each sound pulse which encompasses the expected reception time at said transducer of sound pulses reflected from vehicles of a second lower height class comprising automobiles, amplifier means receiving an input signal for each received reflection pulse and being governed respectively also by both said first and second timing means for producing a first output signal for each sound pulse reflection received from a vehicle of said first height class and a second different output signal for each reflection pulse obtained from a vehicle of said second height class, and output circuit means being differently responsive to said first and second output signals for indicating in response to a successive of said first output signals the presence of a vehicle of said first height class and for indicating in response to a succession of said second output signals the passage of a vehicle of said second height class, and temperature responsive means affected by the temperature of the air through which said sound pulses are transmitted and coupled to at least one of said first and second timing means to control the time of occurrence of said first and second time intervals respectively demarcated thereby relative to the last-transmitted sound pulse in accordance with the time of propagation of said sound pulses.

10. The vehicle detection system of claim 9 having manually adjustable means associated with at least one of said first and second timing means to thereby vary the duration of the respective intervals demarcated thereby.

11. In a sonic-reflection type of vehicle presence and classification detector, means for transmitting repetitive sound pulses downwardly toward the pavement so as to impinge upon the tops of vehicles which may pass through said beam, receiving means including an electro-accoustical transducer positioned to receive reflections of said sound pulses from said vehicle and from said pavement, first timing means responsive to each transmitted sound pulse for demarcating a first time period in the interval between successive transmitted sound pulses, a first adjusting means coupled to said first timing means for varying the duration of said first time period, a second timing means responsive to said first timing means for demarcating a second time period also in the interval between successive transmitted sound pulses and only upon the termination of said first time period, second adjusting means coupled to said second timing means for varying the duration of said second time period, whereby said second adjusting means may be adjusted to cause said second time period to encompass the expected time of reception by said transducer of a reflection of the last transmitted sound pulse from vehicles having heights representative of automobiles wherefore said first time period will then encompass the expected reception time of reflection pulses from vehicles of greater height such as trucks, and whereby said first adjusting means may be adjusted to cause said second time period to terminate prior to the expected reception time by said transducer of reflections of the last-transmitted sound pulse from said pavement, output means coupled to said transducer and also to said first and second timing means and being differently responsive to received reflection pulses in accordance with whether they are received in said first or said second time period to thereby separately detect on the one hand trucks and other high vehicles and on the other hand automobiles and similar low vehicles, and means responsive to the temperature of the air through which said sound pulses are transmitted for delaying the initiation of said first-timed interval relative to the time of occurrence of the last-transmitted sound pulse in accordance with said temperature.

References Cited by the Examiner
UNITED STATES PATENTS

| | | | |
|---|---|---|---|
| 2,780,795 | 2/57 | Ambrosio | 340—3 |
| 2,908,888 | 10/59 | Kirkland | 340—3 |
| 3,006,184 | 10/61 | Goldman | 340—3 |
| 3,030,608 | 4/62 | Polster | 340—3 |
| 3,042,303 | 7/62 | Kendall et al. | 340—38 |
| 3,045,909 | 7/62 | Auer, Jr. | 340—38 |
| 3,110,007 | 11/63 | Frielinghaus | 340—38 |

NEIL C. READ, *Primary Examiner.*

BENNETT G. MILLER, *Examiner.*